June 10, 1958 — W. C. GATES — 2,838,401
PUFFING METHOD AND APPARATUS
Filed Feb. 1, 1955
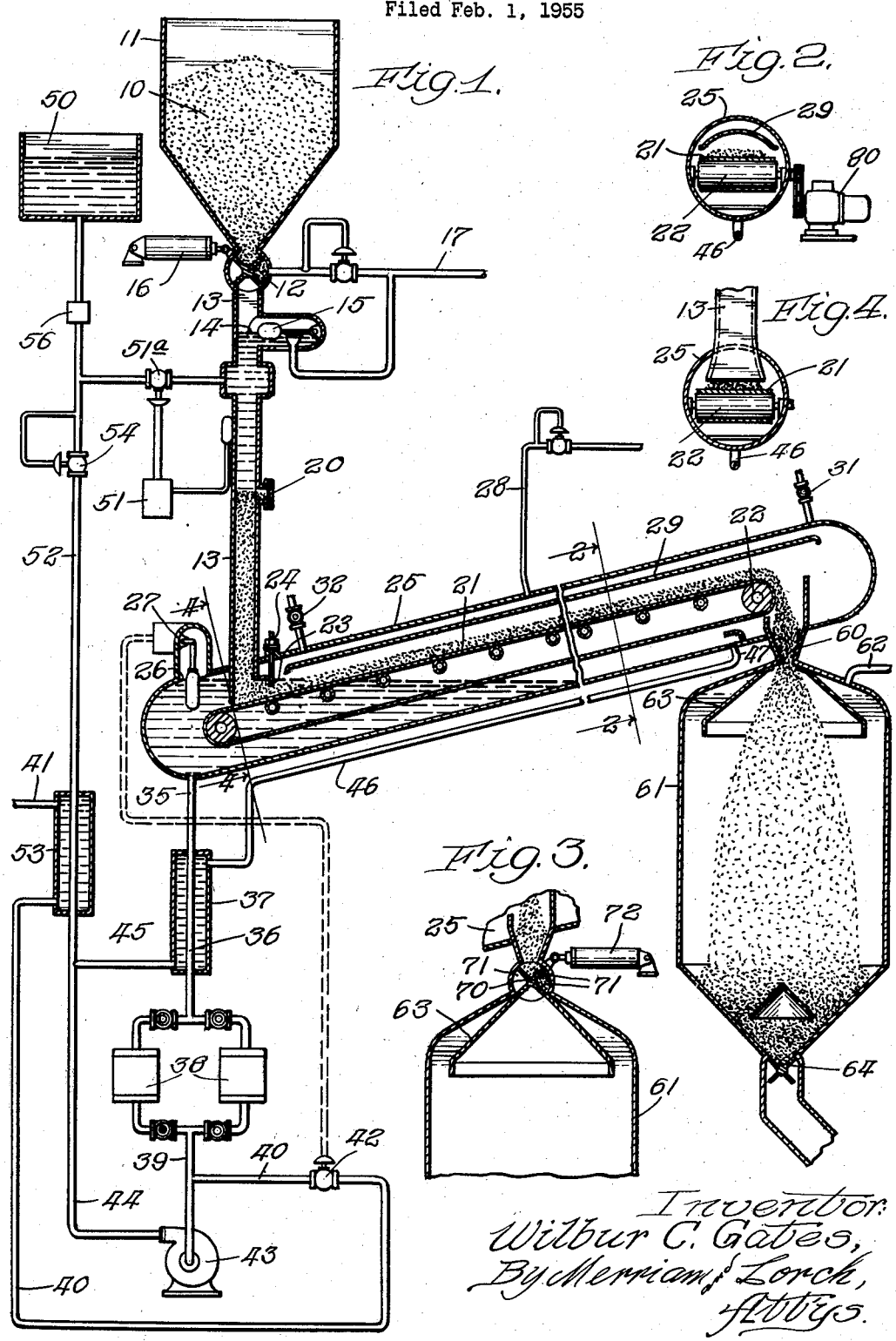
Inventor:
Wilbur C. Gates,
By Merriam & Lorch,
Attys.

United States Patent Office 2,838,401
Patented June 10, 1958

2,838,401

PUFFING METHOD AND APPARATUS

Wilbur C. Gates, Flossmoor, Ill., assignor, by direct and mesne assignments, of one-half to Chicago Bridge & Iron Company, and one-half to Baerguard, Inc., Chicago, Ill., a corporation of Illinois Application February 1, 1955, Serial No. 485,472

14 Claims. (Cl. 99—82)

This invention relates to a method of puffing cereal in granular form and to an apparatus therefor.

It has heretofore been proposed to cook cereal products such as rice, corn, wheat, and the like, in an atmosphere substantially of steam and then to puff the cereal by an explosive reduction of pressure to an absolute pressure near zero wherein the cereal is cold set by reason of the chilling effect of the evaporation of water into the vacuum. This invention is an improvement in method on the ones heretofore described and also provides apparatus for a continuous puffing operation so that the capacity of the puffing chamber is not limited by the necessity of waiting for individual charges to be cooked; but at the same time, this invention provides a means for tempering products which have their water content adjusted before cooking.

The invention is illustrated in the drawings in which Figure 1 is a sectional elevation of the structure; Figure 2 is a vertical section taken along the line 2—2 in Figure 1; Figure 3 is a fragmentary section elevation of the top of the puffing chamber illustrating an alternative means of providing a substantially continuous puff. Figure 4 is a section through line 4—4 in Figure 1.

The controls, connections, valves, pumps, and the like, are in themselves conventional and are diagrammatically illustrated.

As shown in the drawings, a cereal 10, such as granulated rice, is fed to a hopper 11. The cereal at this stage should be freeflowing—that is, have low enough moisture content so that it will not stiffen or arch. Normally cereals as received will have this quality.

From the hopper 11, the rice drops into a conventional lock mechanism 12 which preferably comprises a star valve 12. The function of the valve is to permit one section thereof to be loaded with the cereal and then rotated so as to discharge its load into the column below without having any substantial gas leak by it.

Below the valve is a vertical tube or column 13 which is filled to the level 14 with water or aqueous fluid. The level of the fluid is maintained by the air controller float valve 15 at the desired level. The star valve 12 is actuated by a time acting control, such as an air cylinder 16. A line 17 connected to a compressed air storage chamber supplies air under pressure to the top of the column 13 when required by the operation of the float valve 15 and also to the loaded section of the star valve as indicated at 18.

Within the column 13 the rice or other cereal forms a pile, the top of which is normally maintained at a predetermined level within the column. A viewing window 20 is provided for the purpose of observing the position of the cereal within the column. The amount of rice supplied may be controlled by the timing of the control 16, or as will be hereinafter explained, by controlling the speed of the belt 21 to the top of which the cereal is fed from the bottom of the column 13. The belt 21 is foraminous and the cereal drops on it near its lower end. The upper side of the belt is driven upwardly at a speed determined by the operator and by means of a variable speed motor 80, as shown in Figure 2, connected to the roller 22. A suitable speed of movement is about six feet per minute, and for rice operating at a maximum steam pressure of 85 lbs. per square inch gauge, a total time of treatment of three minutes is suitable.

A third means of controlling the feed of cereal from column 13 is the dam or weir 23, the height of which may be adjusted through the control arm 24 thus adjusting the amount or level of the cereal which will be carried upwardly on the belt 21.

The water within the cooking chamber 25 is controlled at a desired level, as indicated at 26, high enough to seal the lower end of column 13. A suitable water level control 27 may be provided for this purpose. Steam is admitted to the vessel 25 through a line 28 under suitable pressure and a baffle or hood 29 is provided so that the steam will not impinge directly upon the cereal and also so that condensate will not drip directly upon the cereal.

It will be observed that a back pressure must be created above the column water in 13 and that is done through the introduction of air from the line 17 as indicated.

At the beginning of the operation and from time to time thereafter, air may be purged from the container 25 through the lines 31 and 32 since it is desired to operate in an air-free atmosphere.

Inasmuch as the steam provides not only a tempering but a washing means, it is desirable to provide a means for removing waste solids and for bleeding off water which may have dissolved starches or other soluble material from the cereal. To this end a bleed line 35 is provided near the bottom of the container from which water passes through the line 36 and the heat exchanger 37 to alternate solids filters 38, one of which may be used while the other is being cleaned. This water then continues through line 39 where some of it branches and goes through the line 40, the amount of which is controlled by the valve 42, and out the exhaust 41 as waste water, and another proportion passes through the centrifugal pump 43 and the line 44 back through the line 45 and the heat exchanger 37 to the line 46 and back into the chamber 25 at the point 47.

The valve 42 is controlled by air pressure through the water float control 27. As the water level rises the amount of air is increased to open valve 42 farther.

Fresh water is supplied from a source 50. This water is controlled as to pH and as to temperature in accordance to the desired ends of the process. Normally a pH slightly below 7 is employed, for example, from 5.0 to 6.0. Some of this fresh water may be employed to control the temperature of the water at the top of the column 13, a conventional system for such purpose being indicated at 51 and including an automatic temperature controller which opens valve 51a when it is desired to cool the water at the top of the column. Another portion passes through the line 52 through the heat exchanger 53 and in through the line 45 together with the recirculated water. Control of this line is accomplished through the automatic valve 54.

A conventional variable displacement pump 56 is provided to supply make up wash water and cooling or heating water from the source 50 to the top of the column.

Once the cereal has been properly moistened and cooked, it is of course under the steam pressure within the chamber 25 and this is normally of such a high degree that when the cereal is suddenly passed to a puffing chamber, within which the pressure is substantially zero, it will puff to the appropriate or desired degree. It is well known, of course, that the amount of puffing will depend upon the type of material, the moisture content, the amount of cooking, the pressure before puffing and the pressure after puffing.

In order to accomplish this sudden and explosive reduction in pressure, the cereal is passed through a restricted orifice 60 to a puffing chamber 61 which is maintained by a suitable vacuum system indicated at 62 at a pressure which is preferably of the order of two-tenths to two inches of mercury absolute. Under normal operating conditions it is preferred to operate near two-tenths of an inch absolute. A shield or baffle 63 is provided in the upper portion of the puffing chamber. A suitably valved exit 64 is provided at the bottom of the chamber. Means may of course be provided within the chamber for heating or drying the puffed material.

A suitable orifice between the pressure chamber and the vacuum chamber is of the order of three-eighths of an inch in diameter.

An alternate form of restricted orifice is shown in Figure 3 in which a time operated star valve 70 is employed having a plurality of chambers 71 no one of whose chambers is ever in communication with both the cooking vessels 25 and the puffing chamber 61 at the same time. A suitable mechanism for operating the star valve in timed relation is indicated at 72.

The column 13 is preferably flared as shown in Figure 4 to provide for expansion of the cereal because of wetting.

Specific examples of the invention:

| | A | B |
|---|---|---|
| 1 | Rice having moisture content of 11%. | Rice having moisture content of 12%. |
| 2 | Height of column 10'. | Height of column 10'. |
| 3 | Temperature of water at the top 70° F. | Temperature of water at the top 70° F. |
| 4 | Time of rice within column 6 minutes. | Time of rice within column 6 minutes. |
| 5 | Time of rice within steaming chamber 3 minutes. | Time of rice within steaming chamber 3 minutes. |
| 6 | Steam pressure in chamber 50# gauge. | Steam pressure in chamber 75# gauge. |
| 7 | Pressure in vacuum chamber 0.2" mercury absolute. | Pressure in vacuum chamber 0.2" mercury absolute. |
| 8 | Amount of puffing 2½ times. | Amount of puffing 4 times. |
| 9 | Final moisture content 20%. | Final moisture content 22%. |

The foregoing detailed description has been given for clearness of understanding only and no unnecessary limitations should be understood therefrom as modifications will be obvious to those skilled in the art.

I claim:

1. The method which comprises supplying cereal in granular form downwardly through a column of water extending upwardly from a body of water in a cooking zone, feeding cereal from the column to the cooking zone wherein it is cooked under substantial pressure in substantial absence of air while the cereal is conveyed from below the water into a steam zone above the water and then passing the cooked cereal through a restricted opening into a maintained vacuum whereby the pressure drop between the cooking zone and the evacuated zone is explosive in nature and the cereal is puffed.

2. The method as set forth in claim 1 in which the top of the water column is under air pressure.

3. The method of claim 1 in which the rate of feed of the cereal through the column and through the cooking zone is regulated to adjust the water content of the cereal.

4. The method of claim 1 in which the rate of feed of the cereal through the column and through the cooking zone is regulated to adjust the water content of the cereal and the degree of cooking thereof.

5. The method of claim 1 in which a water seal is maintained above the product until it emerges into the steam zone.

6. Apparatus comprising means for feeding cereal through a lock to a column under pressure, means for maintaining a column of water of predetermined height therein, means for regulating the time of passage of the cereal therethrough, means for withdrawing cereal from the bottom of the column, means for draining water therefrom, a cooking chamber in direct communication with the column, means for supplying steam within the cooking chamber, means for progressively passing the cereal from the column through the chamber to and through a restricted orifice, a vacuum chamber of large size in communication with the cooking chamber through said restricted orifice, means for maintaining a puffing vacuum within the vacuum chamber, and means for withdrawing puffed cereal from the vacuum chamber.

7. Apparatus as set forth in claim 6 in which means are provided for removing air from the cooking chamber.

8. Apparatus as set forth in claim 6 in which means are provided for varying the rate of advance for the cereal through the cooking chamber whereby the cooking time may be regulated.

9. Apparatus as set forth in claim 6 in which control means are provided to determine the rate of flow of cereal from the column to the cooking chamber independent of the rate of movement of the cereal through the cooking chamber.

10. Apparatus as set forth in claim 6 in which the column is so positioned with respect to the cooking chamber that the cereal flows by gravity from the column into the chamber and a water seal is maintained between the column and the chamber.

11. Apparatus comprising a column, means for supplying water to the column, a lock near the top of the column, means for supplying cereal grain by gravity through the lock whereby it will fall through the water in the column, means for maintaining a predetermined depth of cereal within the column, and enclosed pressure vessel in direct communication with the column, means for maintaining a water level in the pressure vessel above the bottom of the column, means for maintaining a zone of substantially air-free steam above the water level in the pressure vessel, conveyor means within the pressure vessel for removing cereal from the bottom of the column, for moving it upwardly and out of the water into the steam atmosphere and for discharging the cereal to a restricted orifice from the pressure vessel, a vacuum vessel in communication with said restricted orifice and means for maintaining a puffing vacuum within the vacuum chamber whereby the cereal discharged thereto is puffed.

12. Apparatus as set forth in claim 11 in which means are provided for controlling the rate of feed of cereal through the pressure vessel and at the same time controlling the height of cereal in the water column.

13. Apparatus as set forth in claim 11 in which means are provided for producing a predetermined back pressure upon the water in the column by regulating the gas pressure between the top of the water in the column and the lock thereabove.

14. The method which comprises supplying raw cereal in granular form to a column of water in free communication with a body of water in a cooking chamber, regulating the return flow of the cereal through the column of water to introduce a predetermined quantity of moisture to the cereal, removing cereal from the foot of the column and conveying it upwardly until it emerges from the body of water into a steam zone in open communication with the water passing the cereal through the steam zone, regulating the time therein to produce a cooked cereal, the cooking zone providing substantially an atmosphere of steam free from air and then passing the cooked cereal through a restricted opening into a maintained vacuum whereby the pressure drop between the cooking zone and the vacuum is explosive in nature and the cereal is thereby puffed.

References Cited in the file of this patent

UNITED STATES PATENTS

| 1,647,483 | Suzuki | Nov. 1, 1927 |
| 2,622,985 | Haughey et al. | Dec. 23, 1952 |
| 2,638,838 | Talmey et al. | May 19, 1953 |
| 2,653,100 | Carman et al. | Sept. 22, 1953 |